(12) United States Patent  
Qian

(10) Patent No.: US 10,097,115 B2  
(45) Date of Patent: Oct. 9, 2018

(54) AUTO-SYNCHRONIZATION OF BRUSHLESS DC MOTORS

(71) Applicant: Infineon Technologies AG, Neubiberg (DE)

(72) Inventor: Weizhe Qian, Beijing (CN)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/345,272

(22) Filed: Nov. 7, 2016

(65) Prior Publication Data

US 2018/0131298 A1    May 10, 2018

(51) Int. Cl.
  *H02P 23/12*    (2006.01)
  *H02P 6/15*    (2016.01)
  *H02P 27/04*    (2016.01)

(52) U.S. Cl.
  CPC ............ *H02P 6/153* (2016.02); *H02P 27/047* (2013.01)

(58) Field of Classification Search
  CPC ....... H02M 2001/0009; H02M 7/5395; H02M 7/53875; H02M 5/4505; H02M 7/219; H02P 27/08; H02P 29/50; H02P 6/15; H02P 2209/07; H02P 6/10; H02P 6/20; H02P 21/36; H02P 3/18; H02P 3/22; H02P 6/14
  USPC .............. 318/400.14, 400.13, 400.1, 400.34, 318/400.35, 459
  See application file for complete search history.

(56) References Cited

U.S. PATENT DOCUMENTS

| | | | | |
|---|---|---|---|---|
| 4,139,885 A | * | 2/1979 | Overzet | H02M 5/4505 363/37 |
| 5,086,261 A | * | 2/1992 | Sakata | G03G 15/5008 318/268 |
| 6,049,194 A | * | 4/2000 | Nakagawa | H02J 7/1484 322/20 |

(Continued)

FOREIGN PATENT DOCUMENTS

| | | |
|---|---|---|
| DE | 102007011885 A1 | 9/2007 |
| DE | 102006026560 A1 | 12/2007 |

(Continued)

OTHER PUBLICATIONS

Mingyao, et al., "A Novel and Easy-Realizing Initial Rotor Position Detection Method and Speedup Algorithm for Sensorless BLDC Motor Drives," 2008 ICEMS, Oct. 17-20, 2008, pp. 2860-2865.

(Continued)

*Primary Examiner* — Jorge L Carrasquillo
(74) *Attorney, Agent, or Firm* — Shumaker & Sieffert, P.A.

(57) ABSTRACT

A controller for controlling a multiphase brushless direct current (BLDC) motor is described. The controller may be configured to determine that the multiphase BLDC motor is operating in a phase delay state in response to determining that an indication of a shunt current for the multiphase BLDC motor satisfies a shunt current threshold and determine that the multiphase BLDC motor is operating in a phase advance state in response to determining that a set of phase-to-ground voltages for the multiphase BLDC motor does not indicate a zero-crossing point. The controller may further be configured to selectively energize each phase of the multiphase BLDC motor based on whether the multiphase BLDC motor is operating in the phase delay state or phase advance state.

16 Claims, 9 Drawing Sheets

(56) References Cited

U.S. PATENT DOCUMENTS

| | | | | |
|---|---|---|---|---|
| 6,812,667 | B2* | 11/2004 | Yasohara | H02P 6/153 318/599 |
| 7,233,121 | B2* | 6/2007 | Wu | H02P 6/15 318/400.17 |
| 7,274,161 | B2* | 9/2007 | Mori | H02P 6/20 318/400.25 |
| 7,902,776 | B2* | 3/2011 | Karwath | H02P 6/18 318/400.07 |
| 7,952,310 | B2* | 5/2011 | Hamasaki | H02P 6/14 318/400.01 |
| 8,027,180 | B2* | 9/2011 | Nakagawa | H02P 9/48 363/132 |
| 8,054,017 | B2* | 11/2011 | Baba | H02P 6/21 318/400.11 |
| 8,203,292 | B2* | 6/2012 | Hamasaki | H02P 29/50 318/400.02 |
| 8,228,012 | B2* | 7/2012 | Hamasaki | H02M 7/53875 318/400.02 |
| 8,424,347 | B2* | 4/2013 | Maekawa | D06F 25/00 68/12.16 |
| 8,917,041 | B2* | 12/2014 | Kishimoto | H02P 6/16 318/400.14 |
| 9,362,860 | B2* | 6/2016 | Sugawara | H02P 6/28 |
| 2004/0007998 | A1* | 1/2004 | Yasohara | H02P 6/10 318/437 |
| 2005/0002657 | A1* | 1/2005 | Wu | H02P 7/29 388/831 |
| 2005/0258788 | A1* | 11/2005 | Mori | H02P 6/20 318/400.12 |
| 2006/0056823 | A1* | 3/2006 | Wu | H02P 6/15 388/831 |
| 2007/0216325 | A1* | 9/2007 | Fukamizu | H02P 6/182 318/400.34 |
| 2008/0018274 | A1* | 1/2008 | Mori | H02P 6/20 318/268 |
| 2008/0048598 | A1* | 2/2008 | Shibuya | H02P 6/185 318/400.1 |
| 2009/0102437 | A1* | 4/2009 | Nakagawa | H02P 9/48 323/217 |
| 2009/0134822 | A1* | 5/2009 | Hamasaki | H02M 7/53875 318/400.04 |
| 2009/0134826 | A1* | 5/2009 | Hamasaki | H02P 6/14 318/400.32 |
| 2009/0146590 | A1* | 6/2009 | Hamasaki | H02P 27/08 318/400.02 |
| 2010/0050703 | A1* | 3/2010 | Maekawa | D06F 25/00 68/23 R |
| 2013/0113400 | A1* | 5/2013 | Kishimoto | H02P 6/16 318/400.14 |
| 2013/0328510 | A1* | 12/2013 | Sato | H02P 6/06 318/400.04 |
| 2014/0152215 | A1* | 6/2014 | DeFilippis | H02P 23/0004 318/400.14 |

FOREIGN PATENT DOCUMENTS

| | | |
|---|---|---|
| DE | 102009003295 A1 | 12/2009 |
| DE | 102015204396 A1 | 9/2016 |

OTHER PUBLICATIONS

"Brushless DC Motor Control with Hall Sensors Using Infineon 8-bit XC866 Microcontroller," AP08026; XC866; Application Note; V1.0.; Oct. 2006; 13 pp.

"BLDC Sensorless Control with XC88x," Industrial and Multimarket Microcontroller, Jun. 2007; Infineon Technologies, 20 slides.

Shen, et al., "Sensorless Flux-Weakening Control of Permanent-Magnet Brushless Machines Using Third Harmonic Back EMF," IEEE Transactions on Industry Applications; vol. 40, No. 6; Nov./Dec. 2004; pp. 1629-1636.

"Flux, Position, and Velocity Estimation in AC Machines Using Carrier Signal Injection," M. W. Degner, University of Wisconsin-Madison, 1998, Chapter 3A, pp. 149-166.

"Flux, Position, and Velocity Estimation in AC Machines Using Carrier Signal Injection," M. W. Degner, University of Wisconsin-Madison, 1998, Chapter 4, pp. 167-230.

Office Action, in the German language, from counterpart German Application No. 102017125934.1, dated Feb. 12, 2018, 5 pp.

* cited by examiner

AUTO-SYNCHRONIZATION OF BRUSHLESS DC MOTORS

TECHNICAL FIELD

This disclosure relates to electric motors, and more particular, to techniques and circuits associated with brushless direct current (BLDC) motors.

BACKGROUND

Operation of brushless direct current (BLDC) motors may be performed by a controller. The controller controls a rotor rotation of the BLDC motor based on a position of the rotor relative to stator coils of the BLDC motor. In some examples, the controller may measure a back electromotive force in undriven coils of the BLDC motor to infer the position of the rotor without separate Hall Effect sensors. In these examples, the controller may be referred to as a "sensor-less" controller.

SUMMARY

The disclosure describes techniques, devices and systems for improving operation of a brushless direct current (BLDC) motor that, rather than relying on Hall Effect sensors, uses the back electromotive force (hereinafter, "back-emf") in undriven coils of the BLDC motor to determine a rotor position of the BLDC motor. However, in some instances, a voltage resulting from the back-emf may be difficult to measure until the rotor rotation of the BLDC motor exceeds a minimum speed.

In some examples, an open-loop voltage over frequency (V/f) control and/or open-loop current over frequency (I/f) may be used to start the BLDC motor without relying on the back-emf. However, with such open-loop control there is a comparatively high risk of failure for accelerating the BLDC motor to achieve the minimum speed suitable for detecting back-emf of undriven coils of the BLDC motor.

Start-up techniques may include using motor salience effects for interior permanent magnet synchronous motors (IPMSM) and using variable inductance effect with a permanent magnet rotor at different positions. However, implementing such techniques may be more complicated and may use more processing power compared with start-up techniques that use the back-emf in undriven coils of the BLDC motor to determine a rotor position of the BLDC motor. Accordingly, in some applications, particularly when one controller controls multiple motors, it may be desirable to use zero-crossing point detection of the back-emf once the rotor rotation of the BLDC motor exceeds a minimum speed.

In accordance with one or more aspects of this disclosure, rather than relying on motor salience or variable inductance effect to start-up a BLDC motor, auto-synchronization techniques are proposed that use a direct current (DC) shunt current and phase-to-ground voltages of the BLDC motor. Accordingly, a risk of failure of the BLDC motor and/or the controller during a start-up state of the BLDC motor may be minimized while minimizing a complexity and cost compared with systems omitting the auto-synchronization technique.

In some examples, the disclosure is directed to a controller for controlling a multiphase BLDC motor. The controller is configured to determine that the multiphase BLDC motor is operating in a phase delay state in response to determining that an indication of a shunt current for the multiphase BLDC motor satisfies a shunt current threshold and determine that the multiphase BLDC motor is operating in a phase advance state in response to determining that a set of phase-to-ground voltages for the multiphase BLDC motor does not indicate a zero-crossing point. The controller is further configured to selectively energize each phase of the multiphase BLDC motor based on whether the multiphase BLDC motor is operating in the phase delay state or phase advance state.

In some examples, the disclosure is directed to a method for controlling a multiphase BLDC motor. The method includes in response to determining that an indication of a shunt current for the multiphase BLDC motor satisfies a shunt current threshold, determining that the multiphase BLDC motor is operating in a phase delay state and in response to determining that a set of phase-to-ground voltages for the multiphase BLDC motor does not indicate a zero-crossing point, determining that the multiphase BLDC motor is operating in a phase advance state. The method further includes selectively energizing each phase of the multiphase BLDC motor based on whether the multiphase BLDC motor is operating in the phase delay state or phase advance state.

In some examples, the disclosure is directed to a system including a three-phase brushless direct current (BLDC) motor, an inverter, and a controller. The inverter is configured to, for each commutation sequence of a set of commutation sequences for the three-phase BLDC, decouple one phase of the three-phase BLDC motor, couple another phase of the three-phase BLDC to a ground via a DC shunt resistive element of very small resistance value (e.g., less than 0.1 ohms), and couple another phase of the three-phase BLDC to a voltage rail. The controller is configured to in response to determining that a shunt current at the DC shunt resistive element satisfies a shunt current threshold, determine that the three-phase BLDC motor is operating in a phase delay state and in response to determining that three-phase back electromotive force of the three-phase BLDC motor do not indicate a zero-crossing point, determine that the three-phase BLDC motor is operating in a phase advance state. The controller is further configured to selectively energize each phase of the three-phase the BLDC motor based on whether the three-phase BLDC motor is operating in the phase delay state or the phase advance state.

The details of one or more examples are set forth in the accompanying drawings and the description below. Other features, objects, and advantages of the disclosure will be apparent from the description and drawings, and from the claims.

DETAILED DESCRIPTION

Figure 1:
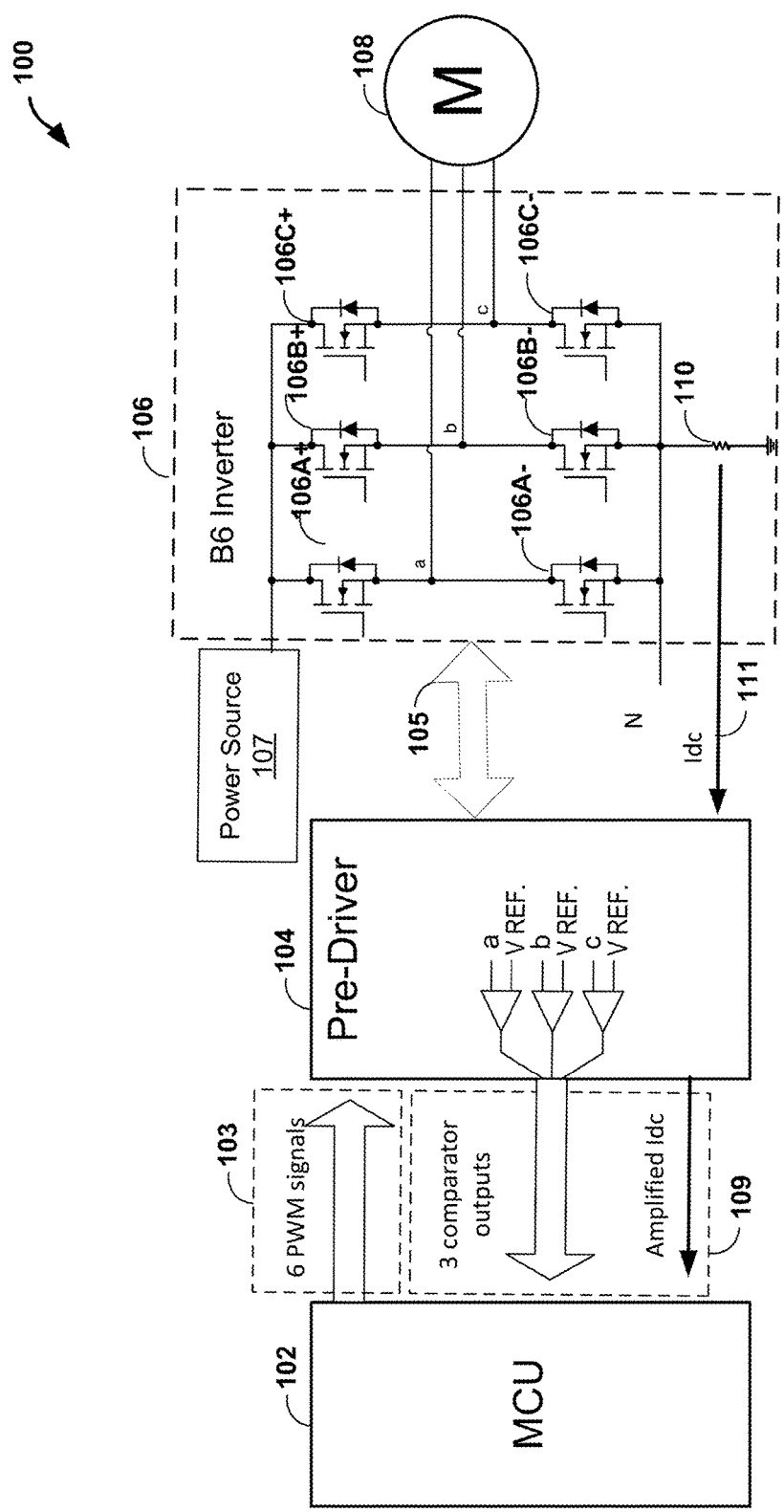
FIG. 1 is a block diagram illustrating an example system configured to start-up and operate by using a back-emf of a BLDC motor, in accordance with one or more techniques of this disclosure.

Some systems may use sensors to directly measure a position of a rotor on a brushless direct current (BLDC) motor. For example, three individual Hall effect sensors may measure a rotating magnetic field that each Hall effect sensor detects in a BLDC motor. In the example, a controller applies voltages to each phase of the BLDC motor according to the rotating magnetic fields detected by the Hall effect sensors. However, using sensors to directly measure the position of the rotor on the BLDC motor may add cost, increase complexity (e.g., additional wiring), as well as reduce reliability of the BLDC motor (e.g., due to a risk of failure in the sensors).

To address the above identified deficiencies of the sensored BLDC motor, some systems may use a sensor-less BLDC motor. For example, rather than relying on an output of a sensor, a controller may apply voltages to each phase of the BLDC motor according to a back electromotive force in undriven coils of the BLDC motor. More specifically, the controller may control the BLDC motor using a back electromotive force voltage (hereinafter, "back-emf voltage") in undriven coils of the BLDC motor. However, because the back-emf voltage is generated by a rotation of the rotor on the BLDC motor, some systems may use a start-up technique until the rotor on the BLDC motor achieves a minimal speed.

Some start-up techniques for sensor-less BLDC motors using the back-emf voltage may use various electrical characteristics of the BLDC motor. For example, some systems may use a motor salience effect for interior permanent magnetic synchronous motors (IPMSM). Some systems may use a variable inductance effect with a permanent magnet (PM) rotor at different positions. However, such start-up techniques may add complexity and increase a start-up time to systems using the back-emf voltage to control the sensor-less BLDC motor.

To address the above identified deficiencies of the sensor-less BLDC motor, auto-synchronization techniques are proposed. More specifically, because systems using the back-emf voltage to control the sensor-less BLDC motor may already include voltage and current detection for each phase of the sensor-less BLDC motor, auto-synchronization techniques using the existing voltage and current detection may add minimal complexity and cost to systems configured to use the back-emf voltage to control the sensor-less BLDC motor.

For example, an auto-synchronization technique may include a system that, rather than directly measuring a zero-crossing point of the BLDC motor to control the BLDC motor, determines whether a zero-crossing point is detected and whether a direct current (DC) shunt current for the BLDC motor is negative. Examples of instances where a DC shunt current for the BLDC motor is negative may include when DC shunt current flows from a ground to the BLDC motor. As used herein, a ground may refer to any suitable reference node, for instance, but not limited to, earth ground, a node of a DC shunt resistor, or another reference node. In the example, a controller shortens a commutation period of the BLDC motor when the DC shunt current is negative and extends the commutation period when the zero-crossing point is not detected. In this manner, the controller may effectively increase the commutation period when the magnetic field driving the rotor of the BLDC motor is in advance of the rotor (e.g., phase advance) and effectively decrease the commutation period when the rotor is in advance of the magnetic field (e.g., phase delay). Such techniques may permit the controller to minimize a risk of failure of the BLDC motor and/or controller during a start-up state.

In some applications, for example an oil pump in a transmission system, it may be desirable to minimize a risk of failure of the BLDC motor during start-up, for instance, to less than 1 failure in every 2 million start-up operations. Additionally, or alternatively, in some applications, it may be desirable to minimize a start-up time, for instance, to less than 255 ms from zero speed to 90% of a maximum speed of the BLDC motor. Accordingly, the controller may use an auto-synchronization technique that shortens a commutation period of the BLDC motor when the DC shunt current is negative and extends the commutation period when the zero-crossing point is not detected such that a start-up time and a risk of failure of the BLDC motor are minimized.

FIG. 1 is a block diagram illustrating example system 100 for controlling the operation of BLDC motor 108, in accordance with one or more aspects of this disclosure. FIG. 1 shows system 100 as having separate and distinct components, shown as controller 102, driver 104, a plurality of switches (e.g., switches 106A+, 106A−, 106B+, 106B−, 106C+, and 106C−, collectively "inverter 106"), power source 107, and BLDC motor 108, however system 100 may include additional or fewer components. For instance, controller 102, driver 104, inverter 106, power source 107, and BLDC motor 108 may be five individual components or may represent a combination of one or more components that provide the functionality of system 100 as described herein. In another example, driver 104 may be omitted.

System 100 may include power source 107, which provides electrical power to BLDC motor 108. For example, when power source 107 includes a generator or generators, transformers, batteries, solar panels, or regenerative braking systems, system 100 may include power source 107. In other examples, system 100 may be separate from power source 107. For example, when power source 107 includes power grids, generators, transformers, external batteries, external solar panels, windmills, hydro-electrical or wind-powered generators, or any other form of devices that are capable of providing electrical power to system 100, system 100 may be separate from power source 107. As described above, numerous examples of power source 107 exist and may include, but are not limited to, power grids, generators, transformers, batteries, solar panels, windmills, regenerative braking systems, hydro-electrical or wind-powered generators, or any other form of devices that are capable of providing electrical power to system 100. In some examples, power source 107 may include a voltage rail for supplying a voltage to components of system 100, for instance, BLDC motor 108.

In some examples, controller 102 may be configured to operate BLDC motor 108 based on inputs 109 that include an indication of one or more phase voltages of BLDC motor 108 and/or an indication of a DC shunt current of BLDC motor 108. That is, controller 102 does not necessarily rely on sensors (e.g., Hall effect sensors), but may use a phase voltage of BLDC motor 108 and a DC shunt current of BLDC motor 108. For example, controller 102 may be configured to generate outputs 103 that include modulated signals that determine the average voltage and current to the coils of BLDC motor 108 and also determine motor speed and torque of BLDC motor 108 based on phase voltages and/or a DC shunt current of BLDC motor 108.

In some examples, controller 102 may control BLDC motor 108 using a six-step commutation sequence for each electrical revolution of BLDC motor 108. In some examples, controller 102 may be a microcontroller on a single integrated circuit containing a processor core, memory, inputs, and outputs. For example, controller 102 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 102 may be a combination of one or more analog components and one or more digital components.

Driver 104 mirrors and generates driver outputs at link 105 based on outputs 103 from controller 102. In some examples, driver 104 may include an insulated-gate bipolar transistor (IGBT) driver, a metal oxide semiconductor field effect transistor (MOSFET) driver, a gallium nitride (GaN) driver, or any other driver capable of mirroring the output from controller 102 and providing the mirrored output to inverter 106. In some examples, driver 104 may mirror and generate inputs 109 based on inputs 111 and feedback at link 105 that includes an indication of a voltage at DC shunt resistor 110 of inverter 106 and phase voltages at inverter 106 and/or BLDC motor 108. DC shunt resistor 110 may have a very small resistance value. For instance, DC shunt resistor 110 may have a resistance of less than 1 ohm or less than 0.1 ohms. In some examples, driver 104 may amplify the indication of a voltage at DC shunt resistor 110 of inverter 106 for inputs 109, which may be sampled by controller during a pulse width modulation (PWM) on cycle and/or during a PWM off cycle. As shown, in some examples driver 104 may be a pre-driver.

Inverter 106 may include a three-phase inverter, where three may be the same number of phases of BLDC motor 108. Inverter 106 includes one or more switches (e.g., MOS power switch transistors based switches, gallium nitride (GaN) based switches, or other types of switch devices) that are controlled by controller 102, according to one or more modulation techniques. Controller 102 may include one or more gate drivers (e.g., driver 104) and control logic to control (e.g., turn-on and turn-off) the one or more switches using modulation techniques. The modulation of the switches of inverter 106 may operate according to pulse density modulation (PDM), pulse width modulation (PWM), pulse frequency modulation (PFM), or another suitable modulation technique. In PWM, the width (i.e., duration) of the pulse is modulated based on a modulator signal. In PDM, the relative density of a pulse corresponds to an analog signal's amplitude. In PFM, the frequency of a pulse train is varied based on the instantaneous amplitude of the modulating signal at sampling intervals. By controlling the switches of inverter 106 using modulation techniques and the techniques as described herein, controller 102 may regulate operation of BLDC motor 108.

In some examples, BLDC motor 108 may include a permanent magnet synchronous motor (PMSM). For example, a PMSM may include a shaft, rotor, stator, and permanent magnet. A permanent magnet may be mounted on or in the rotor. In some examples, the permanent magnet may be surface mounted to the rotor, inset in the rotor, or buried within the rotor. In some examples, the permanent magnet may be an interior magnet. The permanent magnet may include rare-earth elements, such as Neodymium-Iron-Boron (NdFeB), Samarium-Cobalt (SmCo), or Ferrite elements (e.g., Barium (Ba) or Strontium (Sr)). In some examples, the permanent magnet may include a protective coating such as a layer of Gold (Au), Nickel (Ni), Zinc (Zn), or the like. In some examples, BLDC motor 108 may be multiphase. For example, BLDC motor 108 may be a three-phase BLDC motor.

Figure 2:
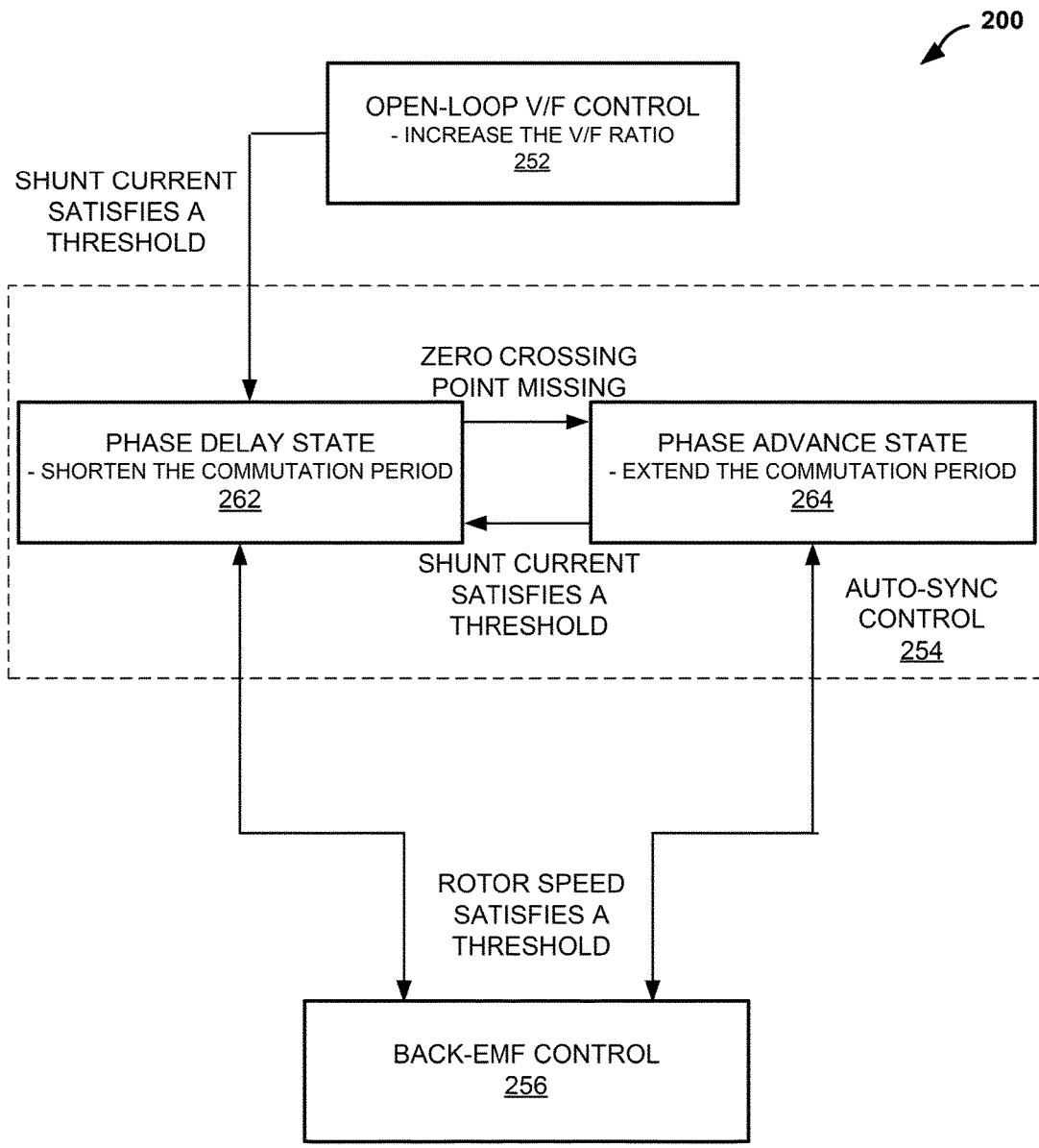
FIG. 2 is an illustration of a start-up using the back-emf of a BLDC motor, in accordance with one or more techniques of this disclosure.

FIG. 2 is an illustration of a start-up technique using the back-emf of a BLDC motor, in accordance with one or more techniques of this disclosure. As illustrated, start-up technique 200 includes open-loop volts-per-hertz (V/f) control 252, auto-synchronous control 254, and back-emf control 256. Auto-synchronous control 254 may include phase delay state 262 and phase advance state 264. For purposes of illustration only, the example performance is described below within the context of system 100 of FIG. 1.

Initially, during open-loop V/F control 252, a rotor of BLDC motor 108 may be stationary. Accordingly, controller 102 may not receive a sufficient back-emf voltage for back-emf control 256 or for auto-synchronous control 254. As used herein, open-loop V/F control may refer to instances where controller 102 may control BLDC motor 108 using a predetermined V/f ratio. In some examples, the predetermined V/f ratio may define a voltage for a frequency of BLDC motor 108. For example, controller 102 may generate outputs 103 that include modulated signals that determine the average voltage and current to the coils of BLDC motor 108 based on a pre-programmed variable vector.

In accordance with one or more techniques described herein, rather than using a predetermined V/f ratio configured to operate BLDC motor 108 between phase delay and phase advance states, controller 102 may be configured to apply a higher V/f ratio than the predetermined V/f ratio such that BLDC motor 108 enters phase delay state 262. For example, controller 102 may determine a modified V/f ratio that is greater than a predetermined V/f ratio for BLDC motor 108. In the example, controller 102 may selectively energize each phase of the BLDC motor 108 according to the modified V/f until BLDC motor 108 enters phase delay state 262. In the example, controller 102 may selectively energize each phase of BLDC motor 108 according to the modified V/f prior to forcing BLDC motor 108 to spin and receiving an indication of a shunt current for BLDC motor 108.

Auto-synchronous control 254 may initiate in phase delay state 262. For example, as discussed above, during open-loop V/F control 252, controller 102 may be configured to apply a higher V/f ratio than the predetermined V/f ratio such that BLDC motor 108 enters a phase delay state 262.

In accordance with one or more techniques described herein, rather than using a predetermined commutation period configured to operate BLDC motor 108, controller 102 may be configured to reduce a commutation period of BLDC motor 108 in response to determining that BLDC motor 108 is operating in phase delay state 262. In this manner, controller 102 may apply a commutation period that is less than the predetermined commutation period such that BLDC motor 108 enters phase advance state 264.

During phase delay state 262, controller 102 may determine whether a set of phase-to-ground voltages for BLDC motor 108 indicate a zero-crossing point. As discussed further in FIGS. 3 and 4, a zero-crossing point may refer to instances where a set of phase-to-ground voltages for BLDC motor 108 does exceed a voltage threshold (e.g., $V_{DC}/2$) during a rising period of a back-emf of BLDC motor 108 and the set of phase-to-ground voltages for BLDC motor 108 is less than the voltage threshold (e.g., $V_{DC}/2$) during a falling period of a back-emf of BLDC motor 108. Accordingly, controller 102 may determine that the set of phase-to-ground voltages for BLDC motor 108 does not indicate a zero-crossing point when the set of phase-to-ground voltages for BLDC motor 108 does not exceed the voltage threshold during the rising period of the back-emf of BLDC motor 108 and the set of phase-to-ground voltages for BLDC motor 108 is not less than the voltage threshold (e.g., $V_{DC}/2$) during the falling period of the back-emf of BLDC motor 108. In response to determining that the set of phase-to-ground voltages for BLDC motor 108 does not indicate a zero-crossing point, controller 102 may determine that BLDC motor 108 is operating in phase advance state 264.

An example of controller 102, includes an analog-to-digital converter (ADC) module configured sample three-phase back-emf at BLDC motor 108. In the example, controller 102 may, using the sampled three-phase back-emf, determine whether a zero-crossing point is detected. For instance, controller 102 may determine whether a zero-crossing point is detected based on a comparison of the sampled three-phase back-emf with a voltage reference (e.g., $V_{DC}/2$). More specifically, the ADC module may be configured to sample a voltage at each phase of BLDC motor 108 to determine a first set of voltages during a rising period of a back-emf of BLDC motor 108 and a second set of voltages during a falling period of the back-emf. In the example, controller 102 is further configured to determine whether each voltage of the first set of voltages exceeds a voltage threshold and to determine whether each voltage of the second set of voltages is less than the voltage threshold. In the example, controller 102 may determine that the three phases of the BLDC motor 108 do not indicate a zero-crossing point in response to determining that each voltage of the first set of voltages does not exceed the voltage threshold and determining that each voltage of the second set of voltages is not less than the voltage threshold. In some examples, system 100 may include one or more resistor dividers that scale down a voltage of the three-phase back-emf such that the sampled three-phase back-emf is within a voltage rating of controller 102.

An example of driver 104, includes a comparator configured to determine whether a zero-crossing point is detected. For example, three comparator outputs may be sent from driver 104 to controller 102 to a detect back-emf zero-crossing point. These signals are comparator outputs between a motor phase voltage and a voltage reference (e.g., $V_{DC}/2$). More specifically, the comparator may be configured to determine whether a voltage at each phase of BLDC motor 108 exceeds a voltage threshold (e.g., $V_{DC}/2$) during a rising period of a back-emf of BLDC motor 108 and to determine whether the voltage at each phase of BLDC motor 108 is less than the voltage threshold during a falling period of the back-emf. In the example, controller 102 determines that the three phases of BLDC motor 108 do not indicate a zero-crossing point in response to determining that the voltage at each phase of BLDC motor 108 does not exceed the voltage threshold during the rising period of a back-emf and determining that the voltage at each phase of BLDC motor 108 is not less than the voltage threshold during the falling period of the back-emf. In some examples, the comparators may be provided internally with driver 104 (e.g., a system on chip (SOC)). In some examples, the comparators may be provided externally from driver 104.

In accordance with one or more techniques described herein, rather than using the predetermined commutation period configured to operate BLDC motor 108, controller 102 may be configured to increase a commutation period of BLDC motor 108 in response to determining that BLDC motor 108 is operating in phase advance state 264. In this manner, controller 102 may apply a commutation period that is greater than the predetermined commutation period such that BLDC motor 108 enters phase delay state 262.

During phase advance state 264, controller 102 may determine whether an indication of a shunt current for BLDC motor 108 satisfies a shunt current threshold. For example, controller 102 may determine whether an indication of a shunt current for BLDC motor 108 included in inputs 109 indicates that the shunt current for BLDC motor 108 is negative. In response to determining that the indication of the shunt current for BLDC motor 108 satisfies (e.g., is negative) the shunt current threshold, controller 102 may determine that BLDC motor 108 is operating in a phase delay state.

During auto-synchronous control 254, controller 102 may repeat the above steps such that the commutation period is shortened to naturally transition BLDC motor 108 from phase delay state 262 to phase advance state 264 and such that the commutation period is increased to naturally transition BLDC motor 108 from phase advance state 264 to phase delay state 262. In this manner, controller 102 may minimize a risk of failure of BLDC motor 108 and/or controller 102 during auto-synchronous control 254 while minimizing a complexity and cost compared with systems omitting the auto-synchronization techniques.

In some examples, during auto-synchronous control 254, controller 102 may selectively energize each phase of BLDC motor 108 based on the predetermined V/f ratio after receiving the indication of the shunt current for the multiphase BLDC motor. That is, rather than using the modified V/f during open-loop V/f control 252, controller 102 may use the predetermined V/f ratio during auto-synchronous control 254 and/or during back-emf control 256.

Figure 9:
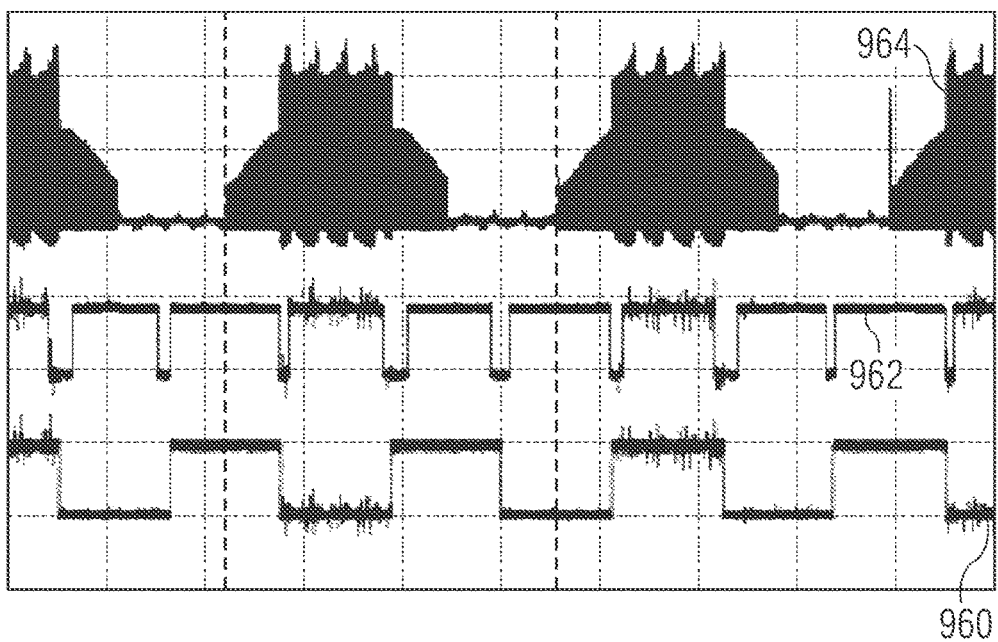
FIG. 9 is an illustration of an exemplary low speed performance using auto-synchronous techniques, in accordance with one or more techniques of this disclosure.
Figure 10:
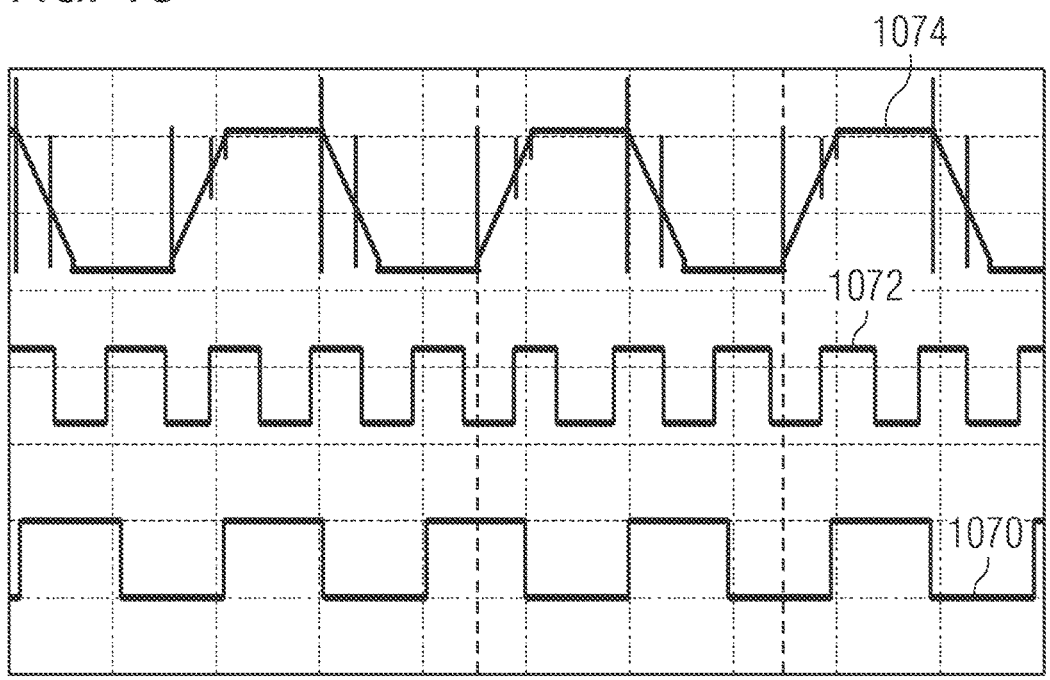
FIG. 10 is an illustration of an exemplary high speed performance using auto-synchronous techniques, in accordance with one or more techniques of this disclosure.

As discussed further with respect to FIGS. 9 and 10, auto-synchronous control 254 may be used to control BLDC motor 108 for any suitable rotor speed of BLDC motor 108. In some examples, however, back-emf control may be used when a rotor speed of BLDC motor 108 satisfies a speed threshold. For example, in response to determining that a rotor speed of BLDC motor 108 satisfies a speed threshold, controller 102 may selectively energize each phase of BLDC motor 108 according to a zero-crossing point detection of a back-emf of BLDC motor 108. As used herein, zero-crossing point detection of a back-emf may refer to instances where a next action in a commutation sequence is activated according to the zero-crossing point detection of a back-emf. Zero-crossing point detection may be configured to synchronize a position of a rotor of BLDC motor 108 with a magnetic field generated by inverter 106 such that a difference between the PM flux direction of BLDC motor 108 and the generated magnetic field is between 60 degrees and 120 degrees.

For example, in response to detecting a back-emf on a undriven phase of BLDC motor 108 that crosses half of a peak voltage applied to a trapezoidal wave applied to an energized phase of BLDC motor 108, controller 102 activates a next action in the commutation sequence after a delay of 30 degrees. In some examples, a commutation sequence may include six actions. In the example, the activation of the next action in the commutation sequence may include causing inverter 106 to couple the previously undriven phase to power source 107 and decouple the previously energized phase from power source 107. In this manner, during back-emf control 256, the commutation sequence for BLDC motor 108 may be controlled according to the zero-crossing point detection of a back-emf.

In some examples, controller 102 may be configured to determine a failure in selectively energizing each phase of BLDC motor 108 according to the zero-crossing point detection of the back-emf. For example, the zero-crossing point detection used in back-emf control 256 may indicate missing, extra, or invalid zero-crossing points. In the example, in response to determining that a failure in selectively energizing each phase of BLDC motor 108 according to the zero-crossing point detection of the back-emf has occurred (e.g., back-emf control 256 has failed), controller 102 may control BLDC motor 108 using auto-synchronous control 254. For instance, controller 102 may selectively energize each phase of BLDC motor 108 based on whether BLDC motor 108 is operating in phase delay state 262 or phase advance state 264 and refrain from selectively energizing each phase of BLDC motor 108 according to the zero-crossing point detection of the back-emf of BLDC motor 108.

Figure 3:
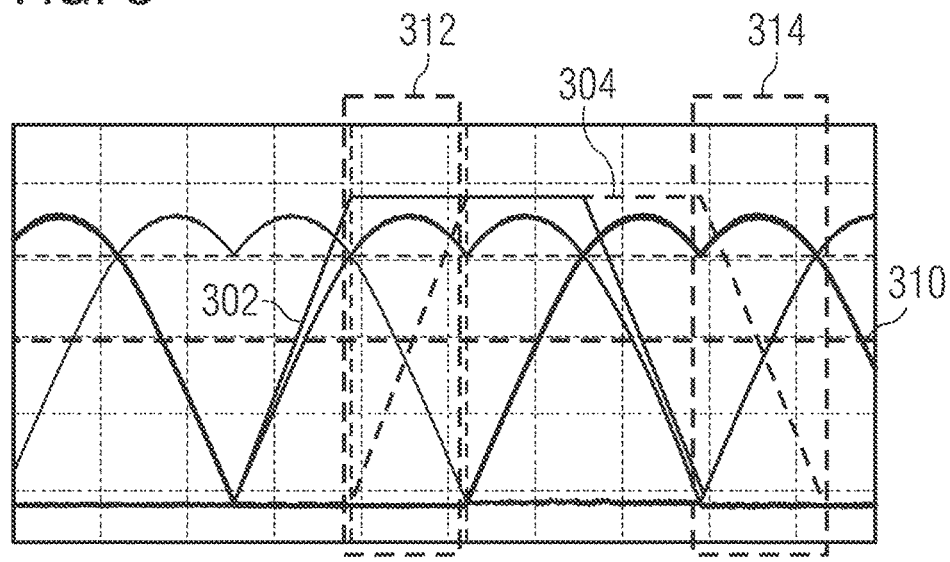
FIG. 3 is an illustration of zero-crossing point detection during phase delay, in accordance with one or more techniques of this disclosure.

FIG. 3 is an illustration of zero-crossing point detection during phase delay, in accordance with one or more techniques of this disclosure. For purposes of illustration only, the example performance is described below within the context of system 100 of FIG. 1 and technique 200 of FIG. 2. FIG. 3 illustrates back-emf 302 and delayed phase voltage 304, which is back-emf 302 delayed by 60 degrees. As shown, during rising period 312 of delayed phase voltage 304, back-emf 302 is above the threshold voltage 310. As shown, threshold voltage 310 is $V_{DC}/2$. During falling period 314 of delayed phase voltage 304, back-emf 302 is below the threshold voltage 310.

Controller 102 may be configured to detect, during rising period 312 of delayed phase voltage 304, that back-emf 302 is above the threshold voltage 310 and detect, during falling period 314 of delayed phase voltage 304, that back-emf 302 is below the threshold voltage 310. In the example, controller 102 may determine that a set of phase-to-ground voltages for BLDC motor 108 indicates a zero-crossing point in response to determining that a phase (e.g., back-emf 302) of a set of phase-to-ground voltages exceeds threshold voltage 310 during rising period 312 of delayed phase voltage 304 of BLDC motor 108 and is less than threshold voltage 310 during falling period 314 of delayed phase voltage 304. Therefore, although the zero-crossing points detected using the above techniques may be insufficient for back-emf control according to zero-crossing points, the "fake" zero-crossing points may be detected during phase delay. That is, controller 102 may determine that BLDC motor 108 is in phase delay state 262 in response to detecting the "fake" zero-crossing points.

Figure 4:
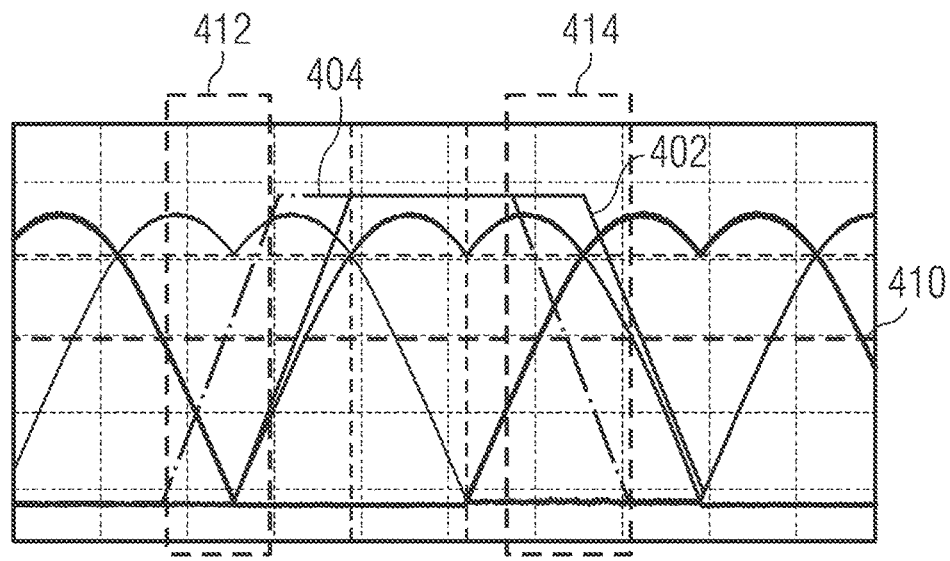
FIG. 4 is an illustration of zero-crossing point detection during phase advance, in accordance with one or more techniques of this disclosure.

FIG. 4 is an illustration of zero-crossing point detection during phase advance, in accordance with one or more techniques of this disclosure. For purposes of illustration only, the example performance is described below within the context of system 100 of FIG. 1 and technique 200 of FIG. 2. FIG. 4 illustrates back-emf 402 and advanced phase voltage 404, which is back-emf 402 advanced by 60 degrees. As shown, during rising period 412 of advanced phase voltage 404, back-emf 402 is below the threshold voltage 410. As shown, threshold voltage 410 is $V_{DC}/2$. During falling period 414 of advanced phase voltage 404, back-emf 402 is above the threshold voltage 410.

Controller 102 may be configured to detect, during rising period 412 of advanced phase voltage 404, that back-emf 402 does not exceed the threshold voltage 410 and detect, during falling period 414 of advanced phase voltage 404, that back-emf 402 is not less than the threshold voltage 410. In the example, controller 102 may determine that a set of phase-to-ground voltages for BLDC motor 108 does not indicate a zero-crossing point in response to determining that a phase (e.g., back-emf 402) of a set of phase-to-ground voltages does not exceed threshold voltage 410 during rising period 412 of advanced phase voltage 404 of BLDC motor 108 and is not less than threshold voltage 410 during falling period 414 of advanced phase voltage 404. Therefore, because the zero-crossing points cannot be detected during phase advance, controller 102 may determine that BLDC motor 108 is in phase advance state 264 in response to determining that the zero-crossing points cannot be detected.

Figure 5:
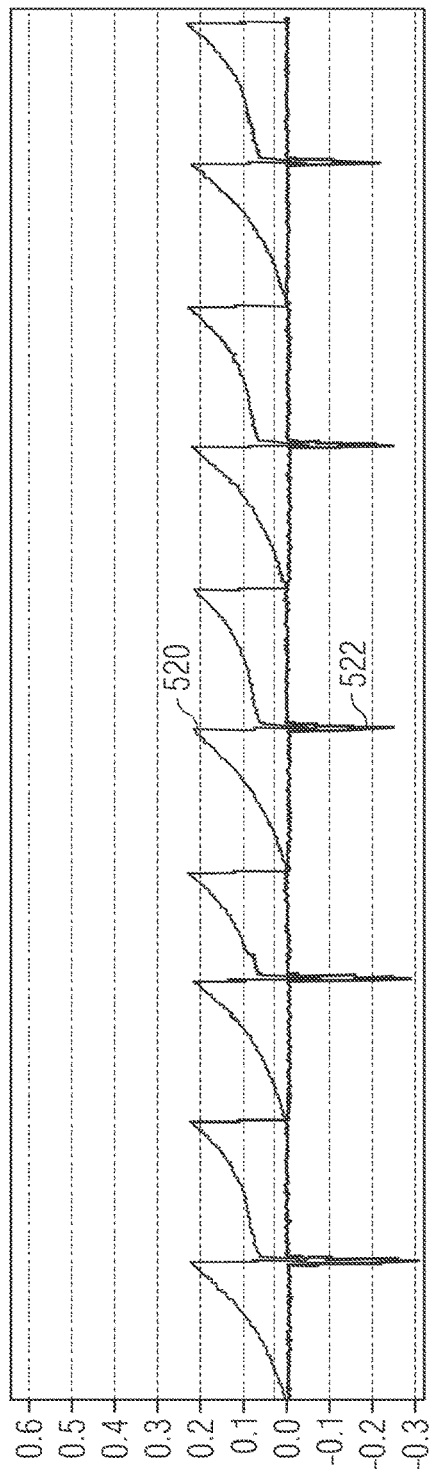
FIG. 5 is an illustration of DC shunt current during phase delay, in accordance with one or more techniques of this disclosure.

FIG. 5 is an illustration of DC shunt current during phase delay, in accordance with one or more techniques of this disclosure. For purposes of illustration only, the example performance is described below within the context of system 100 of FIG. 1 and technique 200 of FIG. 2. FIG. 5 illustrates DC shunt current during a pulse-width modulation (PWM) on state 520 and a DC shunt current during a PWM off state 522. As shown, during phase delay, DC shunt current during a PWM off state 522 is negative for a free-wheeling stage after a low-side switch (e.g., MOSFET) of inverter 106 switches off. In some examples, DC shunt current during a PWM off state 522 is negative because the current of the turn-off phase is too large and is discharged through the shunt. Therefore, controller 102 may determine that BLDC motor 108 is in phase delay state 262 in response to determining that DC shunt current during PWM off state 522 is negative.

Figure 6:
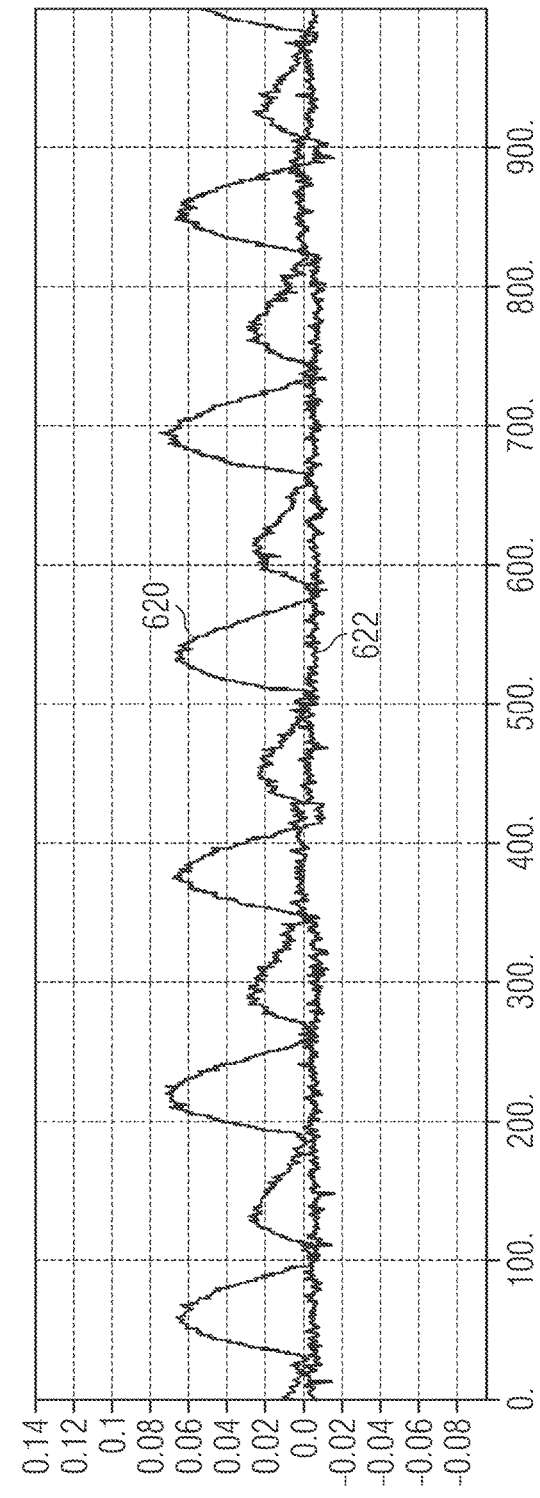
FIG. 6 is an illustration of DC shunt current during phase advance, in accordance with one or more techniques of this disclosure.

FIG. 6 is an illustration of DC shunt current during phase advance, in accordance with one or more techniques of this disclosure. For purposes of illustration only, the example performance is described below within the context of system 100 of FIG. 1 and technique 200 of FIG. 2. FIG. 6 illustrates DC shunt current during a pulse-width modulation (PWM) on state 620 and a DC shunt current during a PWM off state 622. As shown, during phase advance, DC shunt current during a PWM off state 622 is zero. As used herein, a current may be zero when a peak magnitude of zero current is less than ten percent of a peak magnitude of a positive current. Therefore, controller 102 may determine that BLDC motor 108 is in phase advance state 264 in response to determining that DC shunt current during PWM off state 622 is substantially zero and/or not negative.

Figure 7:
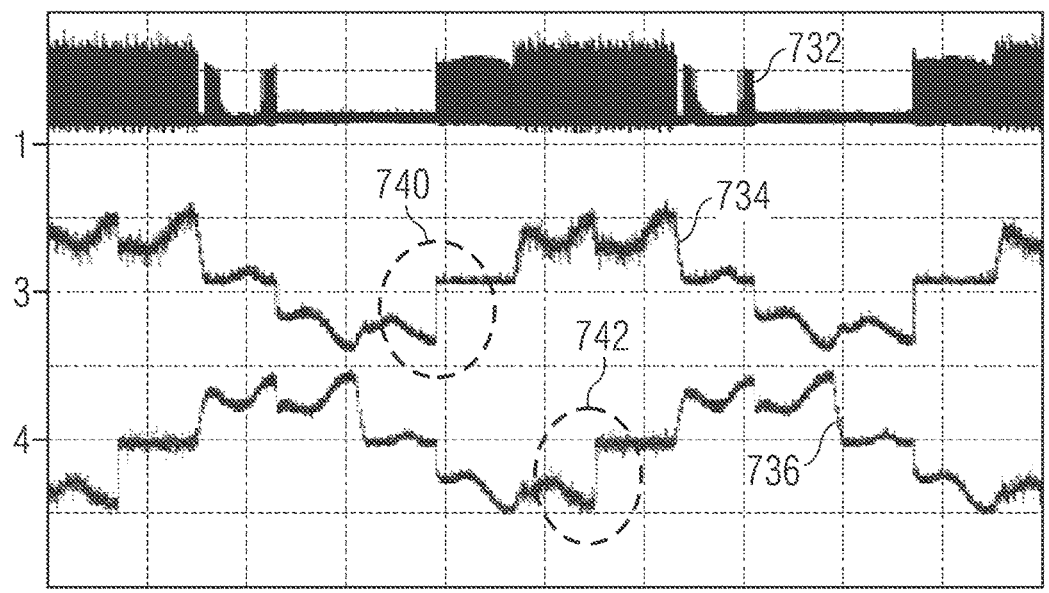
FIG. 7 is an illustration of phase currents and voltages during phase delay, in accordance with one or more techniques of this disclosure.

FIG. 7 is an illustration of phase currents and voltages during phase delay, in accordance with one or more techniques of this disclosure. For purposes of illustration only, the example performance is described below within the context of system 100 of FIG. 1 and technique 200 of FIG. 2. FIG. 7 illustrates phase to ground voltage 732, a first phase current 734, and a second phase current 736. As shown, at time 740, first phase current 734 has a negative DC shunt current. Similarly, at time 742, second phase current 736 has a negative DC shunt current.

Figure 8:
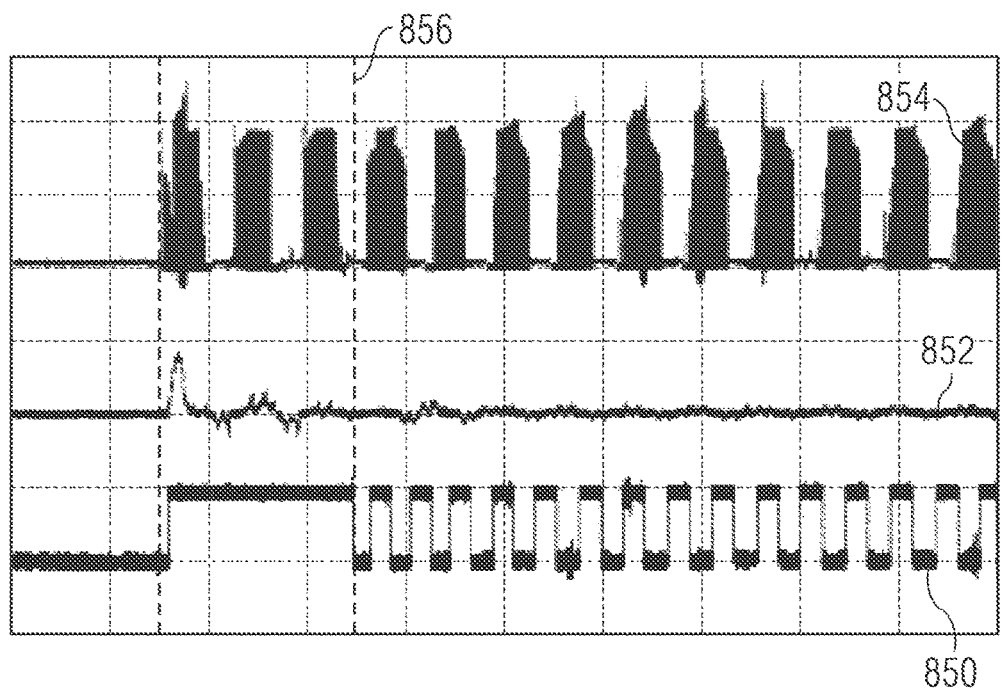
FIG. 8 is an illustration of an exemplary start-up performance using auto-synchronous techniques, in accordance with one or more techniques of this disclosure.

FIG. 8 is an illustration of an exemplary start-up performance using auto-synchronous techniques, in accordance with one or more techniques of this disclosure. For purposes of illustration only, the example performance is described below within the context of system 100 of FIG. 1 and technique 200 of FIG. 2. FIG. 8 illustrates synchronization index 850, phase current 852, and phase voltage 854 during a start-up according to one or more techniques described herein. As shown, after time 856 of 98 milliseconds (e.g., 3 electrical cycles) a motor rotor of BLDC motor 108 is synchronized. As shown, auto-synchronous control 254 of FIG. 2 is used prior to time 856 and back-emf control 256 of FIG. 2 is used after time 856. As previously noted, in applications, such as TCU oil pumps, where start-up time must be short, the exemplary start up time of 98 milliseconds satisfies a short start-up time.

FIG. 9 is an illustration of an exemplary low speed performance using auto-synchronous techniques, in accordance with one or more techniques of this disclosure. For purposes of illustration only, the example performance is described below within the context of system 100 of FIG. 1 and technique 200 of FIG. 2. FIG. 9 illustrates synchronization index 960, zero crossing point 962, and phase voltage 964 according to one or more techniques described herein. As shown auto-synchronous control 254 of FIG. 2 is used at a stable speed operation of 14.8 Hz and back-emf control 256 of FIG. 2 is omitted.

FIG. 10 is an illustration of an exemplary high speed performance using auto-synchronous techniques, in accordance with one or more techniques of this disclosure. For purposes of illustration only, the example performance is described below within the context of system 100 of FIG. 1 and technique 200 of FIG. 2. FIG. 10 illustrates synchronization index 1070, zero crossing point 1072, and phase voltage 1074 according to one or more techniques described herein. As shown, auto-synchronous control 254 of FIG. 2 is used at a stable speed operation of 170 Hz and back-emf control 256 of FIG. 2 is omitted. As shown in FIGS. 9 and 10, auto-synchronous control 254 of FIG. 2 may operate at a speed ratio of more than 10, which may be considered as supporting a wide speed drive system.

Figure 11:
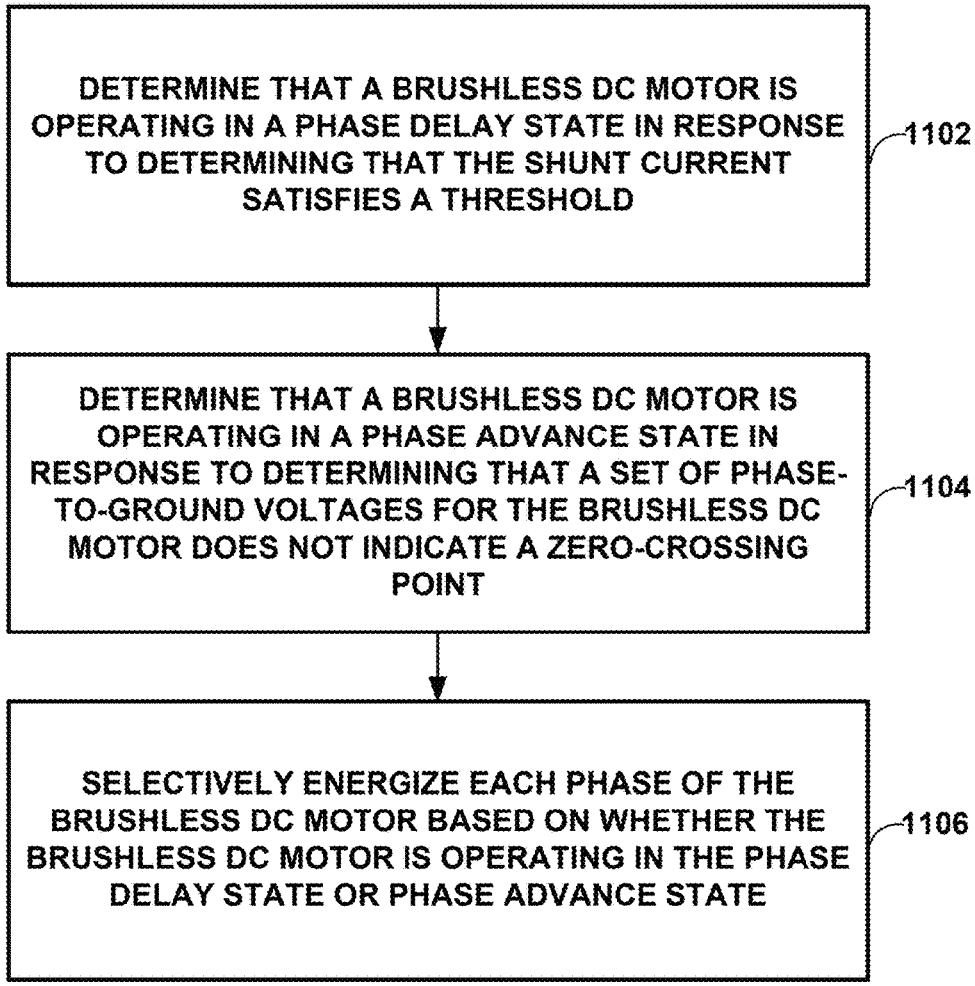
FIG. 11 is a flow diagram consistent with techniques that may be performed by a circuit in accordance with this disclosure.

FIG. 11 is a flow diagram consistent with techniques that may be performed by a circuit in accordance with this disclosure. For purposes of illustration only, the example operations are described below within the context of system 100 of FIG. 1 and technique 200 of FIG. 2.

In accordance with one or more techniques of this disclosure, controller 102 determines that a brushless DC motor is operating in a phase delay state in response to determining that the shunt current satisfies a threshold (1102). For example, in response to controller 102 determining that the shunt current is negative during a PWM off state, controller 102 determines that BLDC motor 108 is operating in a phase delay state. In the example, in response to controller 102 determining that the shunt current is not negative during the PWM off state, controller 102 determines that BLDC motor 108 is not operating in the phase delay state.

Controller 102 determines that a brushless DC motor is operating in a phase advance state in response to determining that a set of phase-to-ground voltages for the brushless DC motor does not indicate a zero-crossing point (1104). For example, in response to controller 102 determining that each phase of a set of phase-to-ground voltages for BLDC motor 108 does not exceed a $V_{DC}/2$ during a rising period of a back-emf of BLDC motor 108 and each phase of the set of phase-to-ground voltages for BLDC motor 108 is not less than $V_{DC}/2$ during a falling period of a back-emf of BLDC motor 108, controller 102 determines that BLDC motor 108 is operating in the phase advance state. In the example, in response to controller 102 determining that a phase of the set of phase-to-ground voltages for BLDC motor 108 exceeds a $V_{DC}/2$ during the rising period of the back-emf of BLDC motor 108 and the phase of the set of phase-to-ground voltages for BLDC motor 108 is less than $V_{DC}/2$ during the falling period of the back-emf of BLDC motor 108, controller 102 determines that BLDC motor 108 is not operating in the phase advance state or advance angle is less than 30 degrees electrically.

Controller 102 selectively energizes each phase of the brushless DC motor based on whether the brushless DC motor is operating in the phase delay state or the phase advance state (1106). For example, controller 102 may be configured to increase a commutation period of BLDC motor 108 in response to determining that BLDC motor 108 is operating in the phase advance state and decrease the commutation period of BLDC motor 108 in response to determining that BLDC motor 108 is operating in the phase delay state.

The following examples may illustrate one or more aspects of the disclosure.

Example 1

A controller for controlling a multiphase brushless direct current (BLDC) motor, the controller being configured to: in response to determining that an indication of a shunt current for the multiphase BLDC motor satisfies a shunt current threshold, determine that the multiphase BLDC motor is operating in a phase delay state; in response to determining that a set of phase-to-ground voltages for the multiphase BLDC motor does not indicate a zero-crossing point, determine that the multiphase BLDC motor is operating in a phase advance state; and selectively energize each phase of the multiphase BLDC motor based on whether the multiphase BLDC motor is operating in the phase delay state or phase advance state.

Example 2

The controller of example 1, wherein the controller is further configured to: selectively energize each phase of the multiphase BLDC motor to reduce a commutation period of the multiphase BLDC motor in response to determining that multiphase BLDC motor is operating in the phase delay state; and selectively energize each phase of the multiphase BLDC motor to increase the commutation period of the multiphase BLDC motor in response to determining that multiphase BLDC motor is operating in the phase advance state.

Example 3

The controller of any combination of examples 1-2, wherein the controller is further configured to: determine a modified volts-per-hertz (V/f) ratio that is greater than a predetermined V/f ratio for the multiphase BLDC motor; and selectively energize each phase of the multiphase BLDC motor according to the modified V/f prior to forcing the multiphase BLDC motor to spin and receiving the indication of the shunt current for the multiphase BLDC motor.

Example 4

The controller of any combination of examples 1-3, wherein the controller is further configured to: selectively energize each phase of the multiphase BLDC motor based further on the predetermined V/f ratio after receiving the indication of the shunt current for the multiphase BLDC motor.

Example 5

The controller of any combination of examples 1-4, wherein the controller is further configured to: in response to determining that a phase of the set of phase-to-ground voltages does not exceed a threshold voltage during a rising period of a back electromotive force of the multiphase BLDC motor and is not less than the threshold voltage during a falling period of the back electromotive force, determine that the set of phase-to-ground voltages for the multiphase BLDC motor does not indicate the zero-crossing point.

Example 6

The controller of any combination of examples 1-5, wherein the controller is further configured to: in response to determining that the phase of the set of phase-to-ground voltages exceeds the threshold voltage during the rising period of the back electromotive force of the multiphase BLDC motor and is less than the threshold voltage during the falling period of the back electromotive force, determine that the set of phase-to-ground voltages for the multiphase BLDC motor indicates the zero-crossing point.

Example 7

The controller of any combination of examples 1-6, wherein the controller is further configured to: determine whether the indication of the shunt current for the multiphase BLDC motor indicates a negative shunt current, wherein the controller is configured to determine that the indication of a shunt current for the multiphase BLDC motor satisfies the shunt current threshold in response to determining that the indication of the shunt current for the multiphase BLDC motor indicates the negative shunt current.

Example 8

The controller of any combination of examples 1-7, wherein the controller is further configured to: in response to determining that a rotor speed of the multiphase BLDC motor satisfies a speed threshold, selectively energize each phase of the multiphase BLDC motor according to a zero-crossing point detection of a back electromotive force of the multiphase BLDC motor.

Example 9

The controller of any combination of examples 1-8, wherein the controller is further configured to: in response to determining a failure in selectively energizing each phase of the multiphase BLDC motor according to the zero-crossing point detection of the back electromotive force of the multiphase BLDC motor, selectively energize each phase of the multiphase BLDC motor based on whether the multiphase BLDC motor is operating in the phase delay state or the phase advance state and refrain from selectively energizing each phase of the multiphase BLDC motor according to the zero-crossing point detection of the back electromotive force of the multiphase BLDC motor.

Example 10

A method for controlling a multiphase brushless direct current (BLDC) motor comprising: in response to determining that an indication of a shunt current for the multiphase BLDC motor satisfies a shunt current threshold, determining that the multiphase BLDC motor is operating in a phase delay state; in response to determining that a set of phase-to-ground voltages for the multiphase BLDC motor does not indicate a zero-crossing point, determining that the multiphase BLDC motor is operating in a phase advance state; and selectively energizing each phase of the multiphase BLDC motor based on whether the multiphase BLDC motor is operating in the phase delay state or phase advance state.

Example 11

The method of example 10, further comprising: selectively energizing each phase of the multiphase BLDC motor to reduce a commutation period of the multiphase BLDC motor in response to determining that multiphase BLDC motor is operating in the phase delay state; and selectively energizing each phase of the multiphase BLDC motor to increase the commutation period of the multiphase BLDC motor in response to determining that multiphase BLDC motor is operating in the phase advance state.

Example 12

The method of any combination of examples 10-11, further comprising: determining a modified volts-per-hertz (V/f) ratio that is greater than a predetermined V/f ratio for the multiphase BLDC motor; and selectively energizing each phase of the multiphase BLDC motor according to the modified V/f prior to forcing the multiphase BLDC motor to spin and receiving the indication of the shunt current for the multiphase BLDC motor.

Example 13

The method of any combination of examples 10-12, further comprising: selectively energizing each phase of the multiphase BLDC motor based further on the predetermined V/f ratio after receiving the indication of the shunt current for the multiphase BLDC motor.

Example 14

The method of any combination of examples 10-13, further comprising: in response to determining that a phase of the set of phase-to-ground voltages does not exceed a threshold voltage during a rising period of a back electromotive force of the multiphase BLDC motor and is not less than the threshold voltage during a falling period of the back electromotive force, determining that the set of phase-to-ground voltages for the multiphase BLDC motor does not indicate the zero-crossing point.

Example 15

The method of any combination of examples 10-14, further comprising: in response to determining that the phase of the set of phase-to-ground voltages exceeds the threshold voltage during the rising period of the back electromotive force of the multiphase BLDC motor and is less than the threshold voltage during the falling period of the back electromotive force, determining that the set of phase-to-ground voltages for the multiphase BLDC motor indicates the zero-crossing point.

Example 16

A system comprising: a three-phase brushless direct current (BLDC) motor; an inverter configured to, for each commutation sequence of a set of commutation sequences for the three-phase BLDC motor, decouple one phase of the three-phase BLDC motor, couple another phase of the three-phase BLDC motor to a ground via a direct current (DC) shunt resistive element, and couple another phase of the three-phase BLDC motor to a voltage rail; and a controller configured to: in response to determining that a shunt current at the DC shunt resistive element satisfies a shunt current threshold, determine that the three-phase BLDC motor is operating in a phase delay state; in response to determining that three phases of the three-phase BLDC motor do not indicate a zero-crossing point, determine that the three-phase BLDC motor is operating in a phase advance state; and selectively energize each phase of the three-phase BLDC motor based on whether the three-phase BLDC motor is operating in the phase delay state or the phase advance state.

Example 17

The system of example 16, further comprising: a pre-driver configured to mirror and generate driver outputs for the inverter based on outputs from the controller.

Example 18

The system of any combination of examples 16-17, wherein the pre-driver is further configured to detect the shunt current at the DC shunt resistive element, wherein the controller is further configured to determine that the three-phase BLDC motor is operating in the phase delay state in response to determining that the detected shunt current at the DC shunt resistive element indicates a current flowing from the ground to a phase of the three-phase BLDC motor.

Example 19

The system of any combination of examples 16-18, further comprising: a comparator configured to determine whether a voltage at each phase of the three-phase BLDC motor exceeds a voltage threshold during a rising period of a back electromotive force of the three-phase BLDC motor and to determine whether the voltage at each phase of the three-phase BLDC motor is less than the voltage threshold during a falling period of the back electromotive force, wherein the controller is further configured to determine that the three phases of the three-phase BLDC motor do not indicate the zero-crossing point in response to determining that the voltage at each phase of the three-phase BLDC motor does not exceed the voltage threshold during the rising period of a back electromotive force and determining that the voltage at each phase of the three-phase BLDC motor is not less than the voltage threshold during the falling period of the back electromotive force.

Example 20

The system of any combination of examples 17-19, further comprising: an analog-to-digital converter (ADC) module configured to sample a voltage at each phase of the three-phase BLDC motor to determine a first set of voltages during a rising period of a back electromotive force of the three-phase BLDC motor and a second set of voltages during a falling period of the back electromotive force, wherein the controller is further configured to determine whether each voltage of the first set of voltages exceeds a voltage threshold and determine whether each voltage of the second set of voltages is less than the voltage threshold, and wherein the controller determines that the three phases of the three-phase BLDC motor do not indicate the zero-crossing point in response to determining that each voltage of the first set of voltages does not exceed the voltage threshold and determining that each voltage of the second set of voltages is not less than the voltage threshold.

Various aspects have been described in this disclosure. These and other aspects are within the scope of the following claims.

The invention claimed is:

1. A controller for controlling a multiphase brushless direct current (BLDC) motor, the controller comprising a processor, the processor being configured to:
    receive, from a driver, an indication of a shunt current for the multiphase BLDC motor;
    determine that the multiphase BLDC motor is operating in a phase delay state when the indication of the shunt current for the multiphase BLDC motor satisfies a shunt current threshold;
    receive, from the driver, an indication of a set of phase-to-ground voltages for the multiphase BLDC motor;
    determine that the set of phase-to-ground voltages for the multiphase BLDC motor does not indicate a zero-crossing point when the indication of the set of phase-to-ground voltages indicates that the set of phase-to-ground voltages does not exceed a threshold voltage during a rising period of a back electromotive force of the multiphase BLDC motor and is not less than the threshold voltage during a falling period of the back electromotive force;
    determine that the set of phase-to-ground voltages for the multiphase BLDC motor indicates the zero-crossing point when the indication of the set of phase-to-ground voltages indicates that the set of phase-to-ground voltages exceeds the threshold voltage during the rising period of the back electromotive force of the multiphase BLDC motor and is less than the threshold voltage during the falling period of the back electromotive force;
    in response to determining that the set of phase-to-ground voltages for the multiphase BLDC motor does not indicate the zero-crossing point, determine that the multiphase BLDC motor is operating in a phase advance state; and
    selectively energize each phase of the multiphase BLDC motor based on whether the multiphase BLDC motor is operating in the phase delay state or the phase advance state.

2. The controller of claim 1, wherein the processor is further configured to:
    selectively energize each phase of the multiphase BLDC motor to reduce a commutation period of the multiphase BLDC motor in response to determining that the multiphase BLDC motor is operating in the phase delay state; and selectively energize each phase of the multiphase BLDC motor to increase the commutation period of the multiphase BLDC motor in response to determining that the multiphase BLDC motor is operating in the phase advance state.

3. The controller of claim 1, wherein the processor is further configured to:

determine a modified volts-per-hertz (V/f) ratio that is greater than a predetermined V/f ratio for the multiphase BLDC motor; and selectively energize each phase of the multiphase BLDC motor according to the modified V/f ratio prior to forcing the multiphase BLDC motor to spin and receiving the indication of the shunt current for the multiphase BLDC motor.

4. The controller of claim 3, wherein the processor is further configured to:

selectively energize each phase of the multiphase BLDC motor based further on the predetermined V/f ratio after receiving the indication of the shunt current for the multiphase BLDC motor.

5. The controller of claim 1, wherein the processor is further configured to:

determine whether the indication of the shunt current for the multiphase BLDC motor indicates a negative shunt current, wherein the processor is configured to determine that the indication of the shunt current for the multiphase BLDC motor satisfies the shunt current threshold in response to determining that the indication of the shunt current for the multiphase BLDC motor indicates the negative shunt current.

6. The controller of claim 1, wherein the processor is further configured to:

in response to determining that a rotor speed of the multiphase BLDC motor satisfies a speed threshold, selectively energize each phase of the multiphase BLDC motor according to a zero-crossing point detection of the back electromotive force of the multiphase BLDC motor.

7. The controller of claim 6, wherein the processor is further configured to:

in response to determining a failure in selectively energizing each phase of the multiphase BLDC motor according to the zero-crossing point detection of the back electromotive force of the multiphase BLDC motor, selectively energize each phase of the multiphase BLDC motor based on whether the multiphase BLDC motor is operating in the phase delay state or the phase advance state and refrain from selectively energizing each phase of the multiphase BLDC motor according to the zero-crossing point detection of the back electromotive force of the multiphase BLDC motor.

8. A method for controlling a multiphase brushless direct current (BLDC) motor comprising:

receiving, from a driver, an indication of a shunt current for the multiphase BLDC motor;

determining that the multiphase BLDC motor is operating in a phase delay state when the indication of the shunt current for the multiphase BLDC motor satisfies a shunt current threshold;

receiving, from the driver, an indication of a set of phase-to-ground voltages for the multiphase BLDC motor;

determining that the set of phase-to-ground voltages for the multiphase BLDC motor does not indicate a zero-crossing point when the indication of the set of phase-to-ground voltages indicates that the set of phase-to-ground voltages does not exceed a threshold voltage during a rising period of a back electromotive force of the multiphase BLDC motor and is not less than the threshold voltage during a falling period of the back electromotive force;

determining that the set of phase-to-ground voltages for the multiphase BLDC motor indicates the zero-crossing point when the indication of the set of phase-to-ground voltages indicates that the set of phase-to-ground voltages exceeds the threshold voltage during the rising period of the back electromotive force of the multiphase BLDC motor and is less than the threshold voltage during the falling period of the back electromotive force;

in response to determining that the set of phase-to-ground voltages for the multiphase BLDC motor does not indicate the zero-crossing point, determining that the multiphase BLDC motor is operating in a phase advance state; and selectively energizing each phase of the multiphase BLDC motor based on whether the multiphase BLDC motor is operating in the phase delay state or phase advance state.

9. The method according to claim 8, further comprising:

selectively energizing each phase of the multiphase BLDC motor to reduce a commutation period of the multiphase BLDC motor in response to determining that the multiphase BLDC motor is operating in the phase delay state; and selectively energizing each phase of the multiphase BLDC motor to increase the commutation period of the multiphase BLDC motor in response to determining that the multiphase BLDC motor is operating in the phase advance state.

10. The method according to claim 8, further comprising:

determining a modified volts-per-hertz (V/f) ratio that is greater than a predetermined V/f ratio for the multiphase BLDC motor; and selectively energizing each phase of the multiphase BLDC motor according to the modified V/f ratio prior to forcing the multiphase BLDC motor to spin and receiving the indication of the shunt current for the multiphase BLDC motor.

11. The method according to claim 10, further comprising:

selectively energizing each phase of the multiphase BLDC motor based further on the predetermined V/f ratio after receiving the indication of the shunt current for the multiphase BLDC motor.

12. A system comprising:

a three-phase brushless direct current (BLDC) motor;

an inverter configured to, for each commutation sequence of a set of commutation sequences for the three-phase BLDC motor, decouple a first phase of the three-phase BLDC motor, couple a second phase of the three-phase BLDC motor to a ground via a direct current (DC) shunt resistive element, and couple a third phase of the three-phase BLDC motor to a voltage rail;

a pre-driver configured to output an indication of a shunt current at the DC shunt resistive element and an indication of a set of phase-to-ground voltages for the three-phase BLDC motor; and a controller comprising a processor, the processor being configured to:

receive, from the pre-driver, the indication of the shunt current at the DC shunt resistive element;

determine that the three-phase BLDC motor is operating in a phase delay state when the shunt current at the DC shunt resistive element satisfies a shunt current threshold;

receive, from the pre-driver, the indication of the set of phase-to-ground voltages for the three-phase BLDC motor;

determine that the three phases of the three-phase BLDC motor do not indicate a zero-crossing point when the indication of the set of phase-to-ground voltages indicates that the set of phase-to-ground voltages does not exceed a threshold voltage during a rising period of a back electromotive force of the three-phase BLDC motor and is not less than the threshold voltage during a falling period of the back electromotive force;

determine that the three phases of the three-phase BLDC motor indicate the zero-crossing point when the indication of the set of phase-to-ground voltages indicates that the set of phase-to-ground voltages exceeds the threshold voltage during the rising period of the back electromotive force of the three-phase BLDC motor and is less than the threshold voltage during the falling period of the back electromotive force;

in response to determining that the three phases of the three-phase BLDC motor do not indicate the zero-crossing point, determine that the three-phase BLDC motor is operating in a phase advance state; and selectively energize each phase of the three-phase BLDC motor based on whether the three-phase BLDC motor is operating in the phase delay state or the phase advance state.

13. The system according to claim 12, wherein the pre-driver is further configured to mirror and generate driver outputs for the inverter based on outputs from the processor.

14. The system according to claim 13, wherein the processor is further configured to determine that the three-phase BLDC motor is operating in the phase delay state in response to determining that the detected shunt current at the DC shunt resistive element indicates a current flowing from the ground to a phase of the three-phase BLDC motor.

15. The system according to claim 12, further comprising:

a comparator configured to generate the indication of the set of phase-to-ground voltages based on a comparison of a voltage at each phase of the three-phase BLDC motor and the threshold voltage during the rising period of the back electromotive force of the three-phase BLDC motor and based on a comparison of the voltage at each phase of the three-phase BLDC motor and the threshold voltage during the falling period of the back electromotive force.

16. The system according to claim 12, further comprising:

an analog-to-digital converter (ADC) module configured to generate the indication of the set of phase-to-ground voltages, wherein, to generate the indication of the set of phase-to-ground voltages, the ADC module is configured to sample a voltage at each phase of the three-phase BLDC motor to determine a first set of voltages during the rising period of the back electromotive force of the three-phase BLDC motor and a second set of voltages during the falling period of the back electromotive force.

\* \* \* \* \*